United States Patent
Kidd et al.

(10) Patent No.: US 9,945,697 B2
(45) Date of Patent: Apr. 17, 2018

(54) MEASUREMENT SCALE WITH PERIODIC NANOSTRUCTURE

(71) Applicant: RENISHAW PLC, Gloucestershire (GB)

(72) Inventors: Matthew Donald Kidd, Stirling (GB); Nicholas John Weston, Peebles (GB); James Reynolds Henshaw, Stroud (GB); Marcus Ardron, Edinburgh (GB); John Dardis, Bristol (GB); Robert Thomson, Edinburgh (GB)

(73) Assignee: RENISHAW PLC, Wotton-under-Edge (GB)

( * ) Notice: Subject to any disclaimer, the term of this patent is extended or adjusted under 35 U.S.C. 154(b) by 24 days.

(21) Appl. No.: 14/654,952

(22) PCT Filed: Jan. 13, 2014

(86) PCT No.: PCT/GB2014/050081
§ 371 (c)(1),
(2) Date: Jun. 23, 2015

(87) PCT Pub. No.: WO2014/111697
PCT Pub. Date: Jul. 24, 2014

(65) Prior Publication Data
US 2015/0369637 A1    Dec. 24, 2015

(30) Foreign Application Priority Data

Jan. 15, 2013  (EP) .................................. 13250007

(51) Int. Cl.
*G01D 5/34* (2006.01)
*B82Y 20/00* (2011.01)
*B23K 26/362* (2014.01)

(52) U.S. Cl.
CPC ........... *G01D 5/345* (2013.01); *B23K 26/362* (2013.01); *B82Y 20/00* (2013.01); *G01D 5/344* (2013.01)

(58) Field of Classification Search
CPC ..... G11B 7/131; G11B 7/1395; G11B 7/1398; G11B 7/24088
See application file for complete search history.

(56) References Cited

U.S. PATENT DOCUMENTS

| 4,484,797 A | 11/1984 | Knop et al. |
|---|---|---|
| 4,526,466 A | 7/1985 | Sandercock |
| 5,334,892 A | 8/1994 | Chitayat |
| 5,436,724 A | 7/1995 | Ishizuka et al. |

(Continued)

FOREIGN PATENT DOCUMENTS

| CN | 1461404 A | 12/2003 |
|---|---|---|
| CN | 101855091 A | 10/2010 |

(Continued)

OTHER PUBLICATIONS

Jun. 14, 2016 Office Action issued in Chinese Application No. 201480004864.9.

(Continued)

*Primary Examiner* — Tony Ko
(74) *Attorney, Agent, or Firm* — Oliff PLC

(57) ABSTRACT

A measurement scale device includes at least one scale marking, wherein the or each scale marking includes at least one periodic nanostructure that represents scale device information.

36 Claims, 11 Drawing Sheets

(56) References Cited

U.S. PATENT DOCUMENTS

| | | | |
|---|---|---|---|
| 6,680,799 | B1 | 1/2004 | Parriaux et al. |
| 6,819,409 | B1 | 11/2004 | Tompkin et al. |
| 6,927,885 | B2 | 8/2005 | Staub et al. |
| 7,830,775 | B2 | 11/2010 | Karns et al. |
| 7,889,616 | B2 | 2/2011 | Kuo et al. |
| 8,020,776 | B2 | 9/2011 | Tompkin et al. |
| 8,395,984 | B2 | 3/2013 | Karns et al. |
| 2003/0072079 | A1 | 4/2003 | Silverstein et al. |
| 2004/0118758 | A1 | 6/2004 | Gordon-Ingram |
| 2004/0240006 | A1 | 12/2004 | Staub et al. |
| 2006/0028962 | A1 | 2/2006 | Zachar et al. |
| 2006/0124741 | A1 | 6/2006 | Mayer et al. |
| 2006/0193550 | A1 | 8/2006 | Wawro et al. |
| 2006/0219676 | A1 | 10/2006 | Taylor et al. |
| 2007/0195672 | A1 | 8/2007 | Karns et al. |
| 2007/0206480 | A1* | 9/2007 | Kuo .............. G11B 7/131 369/112.16 |
| 2009/0214885 | A1 | 8/2009 | Her et al. |
| 2010/0188959 | A1 | 7/2010 | Kim et al. |
| 2010/0253760 | A1 | 10/2010 | Audouard et al. |
| 2011/0024022 | A1 | 2/2011 | Ardron et al. |
| 2011/0173832 | A1 | 7/2011 | Gribble et al. |
| 2012/0018993 | A1* | 1/2012 | Boegli ............ B23K 26/0084 283/74 |

FOREIGN PATENT DOCUMENTS

| | | |
|---|---|---|
| CN | 101916040 A | 12/2010 |
| CN | 102798615 A | 11/2012 |
| EP | 0 207 121 A1 | 1/1987 |
| EP | 0 421 024 A1 | 4/1991 |
| EP | 2051047 A1 | 4/2009 |
| GB | 2395005 A | 5/2004 |
| JP | H06-003164 A | 1/1994 |
| JP | 2000147228 A | 5/2000 |
| JP | 2003247864 A | 9/2003 |
| JP | 2004529344 A | 9/2004 |
| JP | 2005534112 A | 11/2005 |
| JP | 2006212646 A | 8/2006 |
| JP | 2008-116342 A | 5/2008 |
| JP | 2010170691 A | 8/2010 |
| JP | 2010539575 A | 12/2010 |
| JP | 2011518335 A | 6/2011 |
| JP | 2011221330 A | 11/2011 |
| JP | 2012507028 A | 3/2012 |
| JP | 2012252306 A | 12/2012 |
| TW | 200609641 A1 | 3/2006 |
| WO | 2007/012215 A1 | 2/2007 |
| WO | 2008/146409 A1 | 12/2008 |
| WO | 2009/090324 A2 | 7/2009 |
| WO | 2009/090324 A3 | 11/2009 |
| WO | 2010/139964 A2 | 12/2010 |
| WO | 2012/038707 A1 | 3/2012 |

OTHER PUBLICATIONS

Jun. 14, 2016 Office Action issued in Chinese Application No. 201480004862.X.
Oct. 15, 2015 Office Action issued in U.S. Appl. No. 14/654,971.
Jul. 25, 2016 Office Action Issued in U.S. Appl. No. 14/654,971.
M. Birnbaum. "Semiconductor Surface Damage Produced by Ruby Lasers", Journal of Applied Physics, 1965, vol. 36, pp. 3688-3689.
A. Borowiec et al. "Subwavelength ripple formation on the surfaces of compound semiconductors irradiated with femtosecond laser pulses", Applied Physics Letters, Jun. 23, 2003, vol. 82, No. 25, pp. 4462-4464.
VS Mitko et al. "Properties of High-Frequency Sub-Wavelength Ripples on Stainless Steel 304L under Ultra Short Pulse Laser Irradiation", Physics Procedia, 2011, vol. 12, pp. 99-104.
Ahsan et al. Colorizing stainless steel surface by femtosecond laser induced micro/nano-structures, Applied Surface Science, 257 (2011), Apr. 12, 2011, pp. 7771-7777.
B. Dusser et al. "News applications in authentication and traceability using ultrafast laser marking", Laser Applications in Microelectronic and Optoelectronic Manufacturing VII, Proc. of SPIE, vol. 7201, 2009, pp. 7210v-1 to 7210v-8.
B. Dusser et al. "Controlled nanostructrures formation by ultra fast laser pulses for color marking", Optics Express 2913, vol. 18, No. 3, Jan. 27, 2010.
AY Vorobyev et al. "Spectral and polarization responses of femtosecond laser-induced periodic surface structures on metals", Journal of Applied Physics, 2008, vol. 103, pp. 043513-1 to 043513-3.
J.E. Sipe et al. "Laser-induced periodic surface structure. I. Theory", The American Physical Society, Jan. 15, 1983, vol. 27, No. 2, pp. 1141-1154.
R. Le Harzic et al. "Gerneration of high spatial frequency ripples on silicon under ultrashort laser pulses irradiation", American Institute of Physics 2011, Applied Physics Letters vol. 98, pp. 211905-1 to 211905-3.
R. Wagner et al. "Subwavelength ripple formation induced by tightly focused femtosecond laser radiation", Applied Surface Science vol. 252 (2006), pp. 8576-8579.
U.S. Appl. No. 14/654,971, filed Jun. 23, 2015 in the name of Kidd et al.
May 30, 2014 Search Report issued in International Application No. PCT/GB2014/050081.
Jun. 27, 2013 Search Report issued in European Application No. 13250007.5.
Jun. 20, 2013 Search Report issued in European Application No. 13250008.3.
May 30, 2014 Search Report issued in International Application No. PCT/GB2014/050080.
Mar. 16, 2017 Office Action issued in U.S. Appl. No. 14/654,971.
Bolle, Matthias, and Sylvain Lazare. "Characterization of submicrometer periodic structures produced on polymer surfaces with low- fluence ultraviolet laser radiation." Journal of applied physics 73.7 (1993): 3516-3524.
Azzam, R. M. A., and N. M. Bashara. "Polarization characteristics of scattered radiation from a diffraction grating by ellipsometry with application to surface roughness." Physical Review B 5.12 (1972): 4721.
Knop, K_. "Rigorous diffraction theory for transmission phase gratings with deep rectangular grooves." JOSA 68.9 (1978): 1206-1210.
Nov. 20, 2017 Office Action issued in U.S. Appl. No. 14/654,971.
Tan, B., and K. Venkatakrishnan. "A femtosecond laser-induced periodical surface structure on crystalline silicon." Journal of Micromechanics and Microengineering 16.5 (2006): 1 080.
Birnbaum, Milton (Nov. 1965).
Bolle, Matthias, et al. "Submicron periodic structures produced on polymer surfaces with polarized excimer laser ultraviolet radiation." Applied physics letters 60.6 (1992): 674-676.
Yao, Jian-Wu, et al. "High spatial frequency periodic structures induced on metal surface by femtosecond laser pulses." Optics express 20.2 (2012): 905-911.
Nov. 21, 2017 Office Action issued in Japanese Application No. 2015-553159.
Nishiuchi S. et al, "Strengthening of Solid-State Joining of Cu using Femtosecond Laser-Induced Periodical Surface Nanostructure", The Review of Laser Engineering, vol. 38, No. 8, pp. 614-619, Laser Society of Japan, Aug. 2010.
Oct. 31, 2017 Office Action issued in Japanese Application No. 2015-553158.

\* cited by examiner

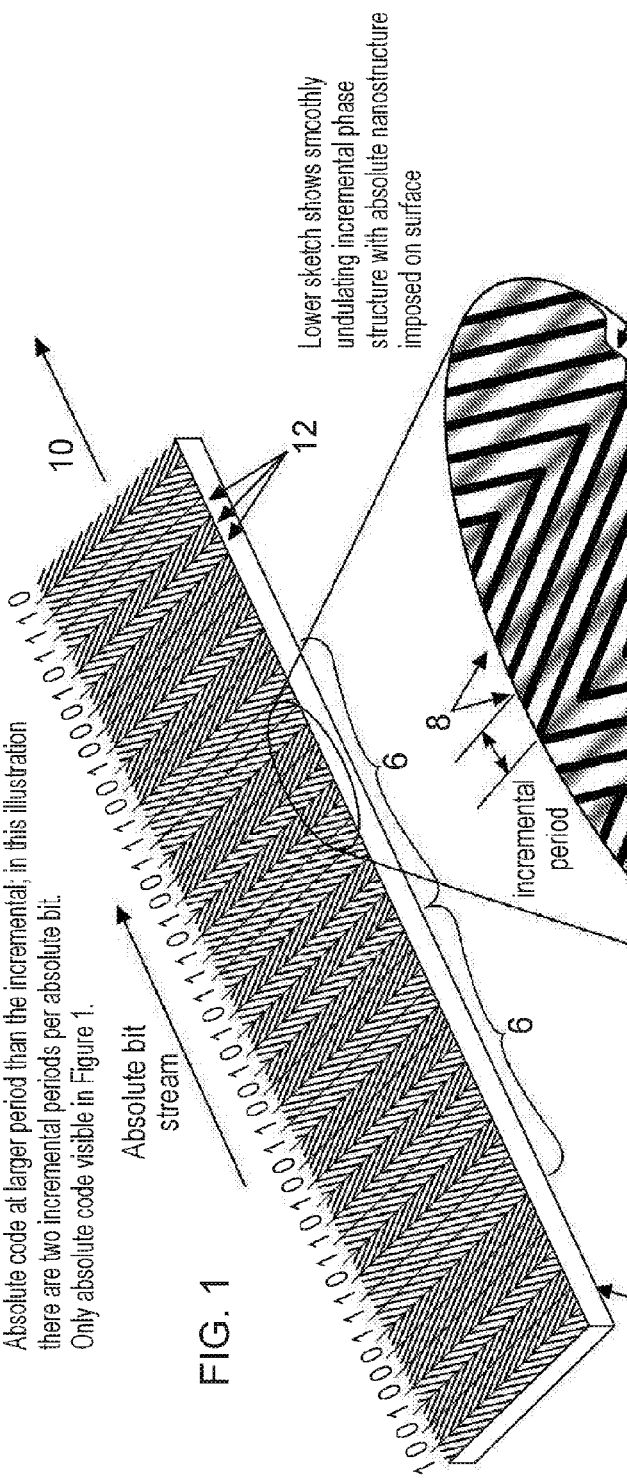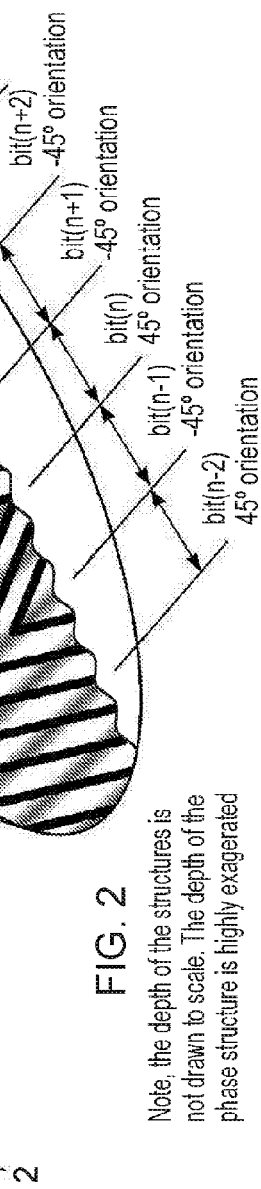
FIG. 1
FIG. 2

MEASUREMENT SCALE WITH PERIODIC NANOSTRUCTURE

FIELD OF THE INVENTION

The present invention relates to a measurement scale, to methods of forming a measurement scale, and to methods of performing measurements using a measurement scale.

BACKGROUND TO THE INVENTION

It is known to use a measurement scale to determine the relative position of two objects. A readhead mounted on one object reads information from a measurement scale mounted on the other object. In the case of an optically-read measurement scale, the readhead projects light onto the measurement scale, which reflects or transmits the light. The reflected or transmitted light is then detected by the readhead, which can use the detected light to determine the relative position of the scale and the readhead along one or more axes of measurement.

Measurement scales that can be optically read when in combination with a readhead may be referred to as optical encoders. There are two basic types of encoder, namely incremental encoders and absolute encoders.

In the case of an incremental encoder, the measurement scale usually comprises a series of identical markings placed at regular intervals along or around an axis of measurement. A readhead is used to project light onto the scale and to detect the resulting transmitted or reflected light. There are various ways of processing the resulting detection signals to determine position. For example, phase information can be determined from the modification of reflected or transmitted light as the readhead moves along the scale. When the readhead is moved along the direction of measurement, it uses the cyclically changing phase information to calculate relative displacement. Additionally, the phase information can be used to interpolate between periodically repeating scale positions, to achieve a reading that is accurate to within a fraction of the scale period.

In the absence of an additional mechanism for determining absolute position, an incremental encoder can be used to determine only relative displacement. Thus, the measurement scale of an incremental encoder may also have further scale markings in the form of one or more reference marks (indicating a reference position), limit marks may also be included (marks indicating either end of the measurement scale).

In the case of an absolute encoder, the measurement scale has markings that form a series of unique codes, for example codewords, each codeword being associated with a particular position along the scale. It is known to configure the readhead such that it can always read at least one full codeword. The readhead can use a look-up table or algorithm to determine the absolute position on the scale based on the unique codeword, and the system is able to uniquely identify its position on start-up without having to first move to a reference point.

Incremental encoders are often relatively simple and form the mainstay of encoder feedback systems. However, absolute encoders are able to identify uniquely the current position on a scale, wherever that position may be along the length of the scale. Absolute encoders can identify position at power-on without the need to movement and alleviate the need to keep precise count of cyclic signals. Absolute encoders can be important in situations where referencing at power up is not easy, safe or even possible. Also, after a fault condition such as excessive acceleration due to impact or loss of power then the absolute encoder uniquely identifies position without needing relative movement between the scale and read head. The scale must present the read head with enough information to uniquely identify position and this can be done with parallel data lines which form a unique word when read simultaneously, or a long enough section of a serial datastream, or a physically absolute method such as time of flight measurement. However, parallel data presented as a number of serial streams placed side-by-side has the disadvantage of being wide and therefore being sensitive to yaw alignment tolerance. Time of flight techniques require the properties of the light path to be well-known so unless the path is evacuated, temperature and humidity fluctuations and turbulence will affect the measurement.

Usually, an absolute encoder will not have as high a resolution as possible with an incremental encoder due to excessively long codewords needed to uniquely identify position along a useful length of scale, and so it can be desirable to add incremental markings to the absolute encoder in order to be able to interpolate between the positions determined by the codewords. For example, incremental scale markings can be provided on a parallel track to the absolute scale markings. However, the use of such parallel tracks makes the system sensitive to the alignment of the readhead and the scale. Yawing of the readhead can result in errors when combining the absolute and incremental positions.

An alternative approach, in which absolute and incremental scale markings are both formed on a single track, is described in GB 2 395 005 in the name of the present applicant, the content of which is hereby incorporated by reference. The track comprises an amplitude scale consisting of a plurality of reflective and nonreflective stripes arranged parallel to one another and having fixed spacing between the stripes in the measurement direction. Stripes are omitted from the repetitive pattern in order to represent data, in a similar fashion to a linear barcode. Data on the scale are split into words and the read head images enough of the scale to include at least one full word irrespective of the read head position along the scale. Position can be uniquely identified from the word read by the read head. The data words represent an absolute scale, and the repetitive pattern of reflective and nonreflective stripes represents an incremental scale. In this approach, the absolute scale is formed by removing elements of the incremental scale.

It is known that ultrafast laser pulse interaction with a surface can result in the formation of a periodic surface structure, which is generally termed a Laser Induced Periodic Surface Structure (LIPSS) or nanoripple structure. The effect of 'a regular system of parallel straight lines' appearing on the surface of various semiconductors damaged by light from a ruby laser was disclosed in "Semiconductor surface damage produced by ruby lasers", Birnbaum, Milton, Journal of Applied Physics, 1965, Vols. 36, 3688. Since then, these structures have been produced using anything from continuous wave to picosecond lasers, but most commonly femtosecond lasers.

Two groups of LIPSS have been identified, Low Spatial Frequency LIPSS (LSFL) and High Spatial Frequency LIPSS (HSFL), as discussed for example in A. Borowiec, H. K. Haugen, Applied Physics Letters, 2003, Vol. 82, No. 25, pp. 4462-4464, and V. S. Mitko, G. R. B. E. Romer, A. J. Huis in 't Veld, J. S. P Skolski, J. V. Obona, V. Ocelik, J. T. M. De Hosson, Physics Procedia, 2011, Vol. 12, pp. 99-104.

It has been suggested in WO 2009/090324 to use LIPSS structures to represent data, for example for identification, traceability or authentication of objects or documents. In WO 2009/090324, data is represented by the orientation of the LIPSS structures, the orientation being controlled by controlling the polarisation of the laser radiation used to form the structure. The data is read by applying light to the structure and determining the colour of the resulting light received from the structure, with the colour of the light received from the LIPSS structure being dependent on the orientation of the LIPSS structure due to diffraction effects. An image capture device, such as a camera, can be used to capture an image of the surface marked with the LIPSS structures, and the data can be processed to determine the colours that are present and the data values represented by the colours.

The control of the colour of a surface by marking the surface with LIPSS structures has also been described in Ahsan et al, Applied Surface Science, 257 (2011), 7771-7777, 2011; in Dusser et al, Laser Applications in Microelectronics and Optoelectronic Manufacturing VII, Proc. of SPIE, Vol. 7201, 2009; and in Dusser et al, Optics Express 2913, Vol. 18, No. 3, 1 Feb. 2010.

WO 2007/012215 describes the use of nanoripple structures to realise figures, logos, pictures and such-like on the surface of an object, for example on printing rollers which can then be embossed on packaging films. The document also mentions the use of the nanoripple structures to change the physical properties of a surface, for example to improve its adhesive or oil-retaining properties.

US 2009/214885 describes systems and methods for fabricating periodic sub-wavelength nanostructures using laser chemical vapour deposition at or near room temperature.

US 2006/219676 describes a method of making long-range periodic nanostructures inside transparent or semi-transparent dielectrics.

US 2006/028962 describes an optical storage medium having a substrate and a plurality of optically detectable marks imprinted on the substrate, the marks having sub-wavelength width. A polarised light source is used to read the marks.

SUMMARY OF THE INVENTION

In a first aspect of the invention there is provided a measurement scale device comprising at least one scale marking, wherein the or each scale marking comprises at least one periodic nanostructure that represents scale device information.

The use of periodic nanostructures to represent scale device information can provide a particularly useful alternative to known representations of scale device information on measurement scale devices.

For example, by representing scale device information using periodic nanostructures it has been found that scale markings can be formed in the same regions of a scale as other scale markings of other types, whilst allowing for the substantially independent reading of the different scale markings despite the proximity of the different scale markings. The ability to independently read markings comprising periodic nanostructures and the scale markings of other types can, for example, enable the different scale markings to be sufficiently closely aligned to avoid yaw effects.

The or each periodic nanostructure may represent scale device information using at least one of orientation, depth and period of the periodic nanostructure.

Each periodic nanostructure may comprise a region of the scale that produces a polarisation effect on electromagnetic radiation applied to the region.

The or each periodic nanostructure may comprise a Laser Induced Periodic Surface Structure (LIPSS).

It has been found that LIPSS structures can be particularly useful as scale markings, as they can be formed in a relatively straightforward and robust manner, either on pre-existing scale devices or scales or on newly produced scale devices or scales. Furthermore, the scale of the LIPSS structures can be such as to not interfere significantly with the reading of scale markings formed of other types of structures, for example stepped or undulating structures of known phase scales or alternating more- and less-reflecting strips of amplitude scales.

The or each periodic nanostructure may comprise a plurality of substantially parallel lines.

The plurality of substantially parallel lines may be regularly spaced at an interval of less than 1 µm, optionally 10 nm to 1 µm in the direction perpendicular to the line extent. Optionally, the interval may be in the range 200 nm to 800 nm, further optionally in the range 400 nm to 650 nm. The period of the nanostructure may be less than the wavelength of light used to read it in applications other than direct visualisation or diffraction techniques.

The scale device information represented by the at least one periodic nanostructure may comprise position information or non-position related data concerning the scale or scale device.

The scale device information may comprise any information that relates to the function of the scale or scale device. It may be position information, or it may be information that may be used in the process of deriving a position, or in the operation of the scale (for example, limit marks may indicate the end of the scale).

The scale device information represented by the at least one periodic nanostructure may comprise at least one of: absolute position information; relative position information; indication of a limit; indication of a reference position; direction information; error information; a scale, scale device or scale manufacturer identifier; authentication or security data. The scale marking may comprise a distance coded mark.

The scale device information represented by the at least one periodic nanostructure may comprise an error map representing errors in an associated series of scale markings.

The at least one scale marking may comprise a scale marking forming part of a series of scale markings. The other scale markings of the series may or may not comprise at least one nanostructure.

The at least one scale marking may comprise a plurality of scale markings forming a first series of scale markings, and the measurement scale further comprises a second series of scale markings.

The first series of scale markings and the second series of scale markings may share a common axis of measurement. By providing first and second series of scale markings that share a common axis of measurement, for example a series of absolute scale markings and a series of incremental scale markings, de-phasing with yaw can be prevented.

The first series of scale markings may comprise one of absolute scale markings, incremental scale markings or reference marks, and the second series of scale markings may comprise another of absolute scale markings, and incremental scale markings, and reference marks The first series of scale markings may form one of an absolute scale or an incremental scale, and the second series of scale markings may form the other of an absolute scale or an incremental scale.

At least one of the first series of scale markings may be overlaid with at least one of the second series of scale markings. The first series of scale markings may be interleaved with the second series of scale markings.

Scale device information represented by the first series of scale markings may be readable independently of reading scale device information represented by the second series of scale markings.

Scale device information may be represented in the second series of scale markings by at least one of: an optical parameter; a magnetic parameter; a capacitive parameter.

The or each scale marking may comprise a plurality of periodic nanostructures. The scale device information may be represented using a property of each of the plurality of periodic nanostructures in combination. At least one of the periodic nanostructure of a scale marking may have a value of the property that is different from the value of the property of another of the periodic nanostructures for that scale marking.

Each periodic nanostructure may represent a data bit. The data bit may comprise a binary digit.

The or each scale marking may represent a code that represents the scale device information. The at least one scale marking may comprise a plurality of scale markings, each scale marking representing a code, each code representing a respective, different position.

The at least one scale marking may comprise a plurality of scale markings, and the scale markings may be substantially identical and/or substantially equally-spaced along a measurement axis.

The property of each periodic nanostructure that represents scale device information may comprise a preferential direction of polarisation. Each periodic nanostructure may reflect or transmits electromagnetic radiation in a first direction of polarisation more strongly than it reflects or transmits electromagnetic radiation in a second direction of polarisation, thereby establishing the preferential direction of polarisation. The electromagnetic radiation may be light in the visible or near-ultraviolet range.

For the periodic nanostructure or each of the periodic nanostructures, a property of the periodic nanostructure that represents the scale device information may have one of a selected number of discrete values. Any suitable number of discrete values may be used. For example, the selected number of discrete values may be one of 2, 3, 4, 5, 6, 7 or 8. Each of the selected number of discrete values may represent a respective data value, for example a respective data bit. The scale device information may be represented by the data values.

For the periodic nanostructure or each of the periodic nanostructures, a property of the periodic nanostructure that represents the scale device information, may vary with displacement along a measurement axis of the scale.

The at least one periodic nanostructure may comprise a plurality of periodic nanostructures, and the periodic nanostructures may be substantially contiguous and/or may overlap.

The lateral extent of each periodic nanostructure along a measurement axis of the scale may be in a range 5 μm to 2000 μm, optionally in a range 5 μm to 500 μm, further optionally in a range 10 μm to 200 μm.

The measurement scale and/or measurement scale device may be formed of at least one of:—a metal, optionally stainless steel, gold, chromium, nickel or silver; a semiconductor material, optionally Si, InP, GaP or GaAs, optionally semiconductor material or material system based on substrates such as Si, Ge, InP, GaAs; a glass, optionally fused silica.

The measurement scale device may comprise a first series of scale markings on a first axis of measurement and a second series of scale markings on a second axis of measurement. The first and second axes may be not parallel. The first and second axes may be substantially perpendicular. The scale device may comprise a two-dimensional scale.

The measurement scale device may form a measurement scale for an encoder.

A measurement scale for an encoder may be formed by the at least one scale marking.

A linear scale for an encoder may be formed by the at least one scale marking.

A rotary scale for an encoder may be formed by the at least one scale marking.

In a further aspect of the invention, an encoder is provided comprising a measurement scale device according to the first aspect of the invention.

In a further aspect of the invention, which may be provided independently, there is provided a method of forming a measurement scale, comprising forming at least one scale marking on a surface, the scale marking comprising a periodic nanostructure that represents scale device information.

The method may comprise applying at least one pulse of linearly polarised laser radiation to a region of the surface to form the at least one scale marking.

The method may comprise applying at least one pulse of laser radiation to the surface to form at least one region of Laser Induced Periodic Surface Structure (LIPSS).

The method may comprise forming a plurality of the scale markings to form a first series of scale markings, and forming a second series of scale markings.

The method may comprise forming the first series of scale markings and the second series of scale markings on a common measurement axis of the scale.

The method may comprise overlaying at least one of the first series of scale markings with at least one of the second series of scale markings. The method may comprise interleaving the first series of scale markings with the second series of scale markings.

The second series of scale markings may comprise a series of peaks and troughs along the surface, for example a series of steps. The method may comprise forming each periodic nanostructure to represent a respective data bit.

The method may comprise forming each scale marking to represent a code.

The method may comprise forming each periodic nanostructure to have a selected one of a plurality of discrete values.

The method may comprise forming each periodic nanostructure so that a property representing scale device information for that periodic nanostructure varies with displacement along a measurement axis of the scale.

In a further aspect of the invention, which may be provided independently, there is provided a method of reading a measurement scale, comprising detecting electromagnetic radiation that is reflected or transmitted by at least one periodic nanostructure, determining at least one property of the periodic nanostructure from the detected electromagnetic radiation, and determining scale device information from the at least one polarisation property.

The method may further comprise applying electromagnetic radiation to the scale, wherein the applied electromagnetic radiation has a maximum intensity at a wavelength that is greater than the period of the periodic nanostructure.

The applied electromagnetic radiation may have a maximum intensity at a wavelength that is at least double the period of the periodic nanostructure, optionally between two times and five times the period of the periodic nanostructure.

The determining of the at least property may comprise determining at least one polarisation property.

The method of reading may comprise at least one of imaging the measurement scale and detecting diffractive effects produced by the at least one periodic nanostructure.

In a further aspect of the invention, which may be provided independently, there is provided an apparatus comprising a source of electromagnetic radiation, a detector for detecting electromagnetic radiation that is reflected or transmitted by at least one periodic nanostructure of the scale, means for determining at least one property of the periodic nanostructure from the detected electromagnetic radiation, and means for determining scale device information from the at least one property.

There is also provided a measurement scale and method substantially as herein described with reference to the accompanying drawings.

Any feature in one aspect of the invention may be applied to other aspects of the invention, in any appropriate combination. For example, apparatus features may be applied as method features and vice versa.

DETAILED DESCRIPTION OF EMBODIMENTS

Embodiments of the invention are now described, by way of non-limiting example, and are illustrated in the following figures, in which:—

FIG. 1 is an illustration of a measurement scale device of a first embodiment;

FIG. 2 is an illustration of an enlarged portion of the scale of the device of FIG. 1;

Figure 3:
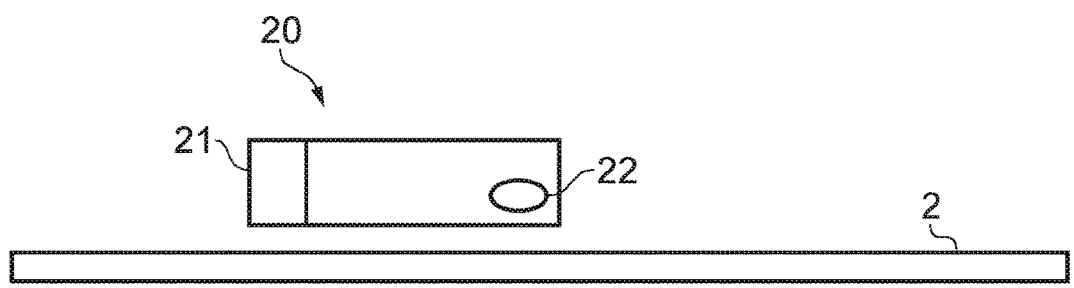
FIG. 3 is a schematic diagram of an apparatus for reading a measurement scale.

FIG. 1 show a first embodiment of a measurement scale device 2, comprising a scale 4 comprising plurality of scale markings. A series of absolute scale markings 6 is overlaid on a series of incremental scale markings 8 along a common axis of measurement 10. The absolute scale markings 6 and incremental scale markings 8 are independently readable. Only the absolute scale markings 6 are illustrated in FIG. 1, for clarity.

FIG. 2 is an illustration of an enlarged portion of the scale 4 of FIG. 1, and shows both the absolute scale markings 6 and the incremental scale markings 8.

In the embodiment of FIGS. 1 and 2, the series of incremental scale markings 8 are made up of a substantially sinusoidal profile of peaks and troughs with amplitude about quarter of the wavelength of operational light (in reflection) or about half the wavelength of operational light (in transmission) formed by laser heating of the surface of the scale device as described, for example, in WO2012/038707 in the name of the applicant, which is hereby incorporated by reference. The device 2 is made of 304 stainless steel and the peaks and troughs are formed on the surface of the 304 stainless steel. The peaks and troughs are illustrated in FIG. 2, but the peak-to-trough height has been exaggerated to make it visible on the drawing. In this embodiment, the peak-to-trough height is 200 nm and the spacing between adjacent peaks is 8 µm. Each of the incremental scale markings can be considered to comprise a complete cycle of the periodic surface.

A series of absolute scale markings 6 is written onto the series of incremental scale markings 8. In this case, each of the absolute scale markings 6 comprises a plurality of periodic nanostructures, in this case Laser Induced Periodic Surface Structures (LIPSS), that comprises a plurality of substantially parallel lines with a periodic spacing in a direction perpendicular to the line extent and with period optionally less than the wavelength of light used to read the scale 4. Formation of LIPSS microstructures is described in more detail below.

In FIGS. 1 and 2, each region of LIPSS is drawn as a shaded area, with the direction of shading indicating the orientation of the substantially parallel lines. Each region of LIPSS can be considered to be a separate periodic nanostructure providing a separate polarisation feature. In the embodiment of FIGS. 1 and 2, the regions of LIPSS comprise substantially parallel lines arranged at either −45 degrees or +45 degrees relative to the axis of measurement. In this embodiment, the regions of LIPSS are contiguous. They may alternatively be overlapping or spatially separated.

Each region of LIPSS is used to represent a binary digit. Each orientation of the lines of the LIPSS regions (for example, +45 degrees and −45 degrees) represents one of the binary states. A plurality of LIPSS regions are arranged to form each absolute scale marking. Each absolute scale marking is a discrete binary codeword that is used to mark a unique position along the axis of measurement.

For example, in FIG. 2 four periodic nanostructures, labelled n−1, n, n+1 and n+2 are shown in whole or part. Each periodic nanostructure represents a bit, and in this case it can be seen that those bits have values of 0, 1, 0 and 1. Those four bits make up part of a single code word that identifies the portion of the scale on which the polarisation features are located.

Periodic nanostructures such as LIPSS distinctively affect the reflection or absorption of polarised light applied to the microstructure, or cause polarisation of light resulting from reflection or transmission of non-polarised light applied to the structure.

Experimental results presented in "Spectral and polarization responses of femtosecond laser-induced period surface structures on metals", A. Y. Vorobyev, Chunlei Guo, Journal of Applied Physics, 2008, Vol 103, 043513 illustrate how polarised light aligned parallel or orthogonal to the lines of surface structures experiences different reflectance. Taking numbers from that figure at 800 nm (a wavelength often used in optical encoders) shows unpolarised light experiences 95% reflectivity from the untreated surface. This is reduced to 77% after the appearance of LIPSS. Reflectivity of polarised light that is aligned parallel to the lines of surface structure is 71%, versus 87% for light that is aligned orthogonal to the lines of surface structure.

The difference in optical reflectivity for regions having different orientations of the surface nanostructure, can be detected using suitable detectors. In order to read the absolute scale markings of the embodiment of FIGS. 1 and 2, it is necessary to distinguish between the +45 deg polarisation features and −45 deg polarisation features. Although these features can be distinguished by the fact that they reflect different polarisations of light differently, this may not be a strong effect. Therefore differential pairs of detectors may be used, and signals from both polarisations may be combined to remove common mode components of the signals.

A schematic diagram of an apparatus for reading the measurement scale of the embodiment of FIGS. 1 and 2 is shown in FIG. 3. FIG. 3 shows the measurement scale device 2 and a readhead 20 comprising a light source 22.

The read head also includes a phase scale detection unit, comprising a multi-channel incremental detector 21a and a light source 21b, which is operable to read the incremental scale markings using conventional techniques. The phase scale detection unit is able to read the incremental scale independently of the reading of the absolute scale by the readhead 20.

Figure 4:
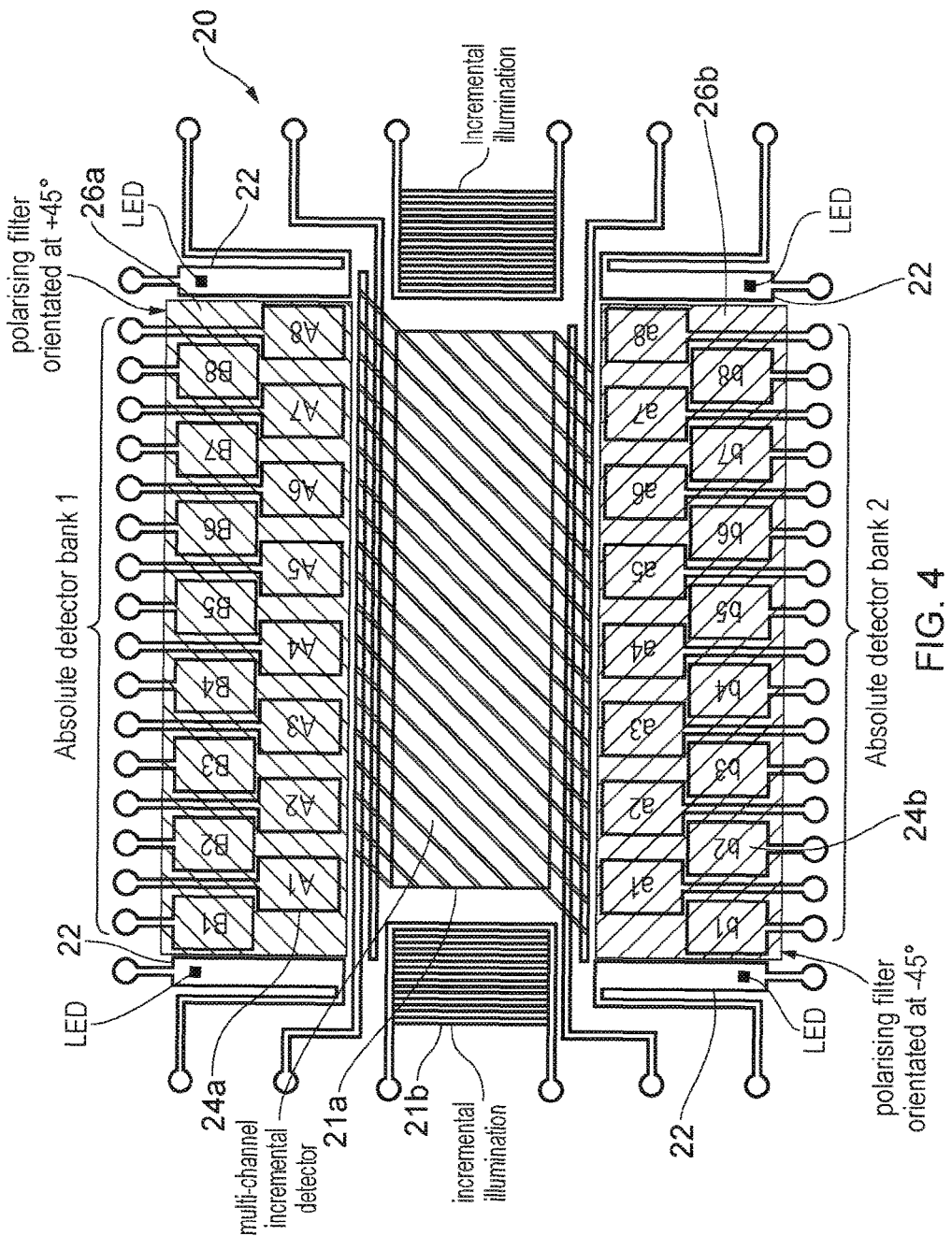
FIGS. 4 and 5 are further schematic diagrams of the apparatus of FIG. 3.

FIG. 4 is a schematic diagram showing the readhead 20 in more detail. The readhead comprises the light source 22, in the form of four LEDs, and two parallel arrays of polarised detectors 24a, 24b. The detectors are arranged in differential pairs for detecting orthogonal polarisations. In FIG. 4, the first parallel array of polarised detectors 24a comprises sixteen detectors labelled A1, A2, A3, A4, A5, A6, A7, A8, B1, B2, B3, B4, B5, B6, B7, B8. The second parallel array of polarised detectors 24b comprises a further sixteen detectors labelled a1, a2, a3, a4, a5, a6, a7, a8, b1, b2, b3, b4, b5, b6, b7, b8.

Optical detectors that are polarisation sensitive can be arranged in differential pairs, each one of the pair being sensitive to the orthogonal polarisation of light to its partner. By this method it is possible to robustly measure weak differences in polarisation measurement by removal of common mode signals. Pairs may be arranged in arrays for detection of fields or streams of polarisation.

In the embodiment of FIG. 4, each detector of detector array 24a is paired with a respective detector of detector array 24b to form a detector pair. In the embodiment of FIG. 4, detectors A1 and a1, A2 and a2, B1 and b1, B1 and b2 etc form detector pairs.

Each detector of each pair of detectors (for example detectors A1 and a1) is made sensitive to polarised light by polarised film 26a, 26b that is placed over the detector. A first detector of the pair (for example, A1) is made sensitive to a first polarisation direction (in this case +45 degrees relative to the measurement axis) and the second detector of the pair (in this case a1) is made sensitive to a second, orthogonal polarisation direction (in this case −45 degrees relative to the measurement axis).

Figure 5:
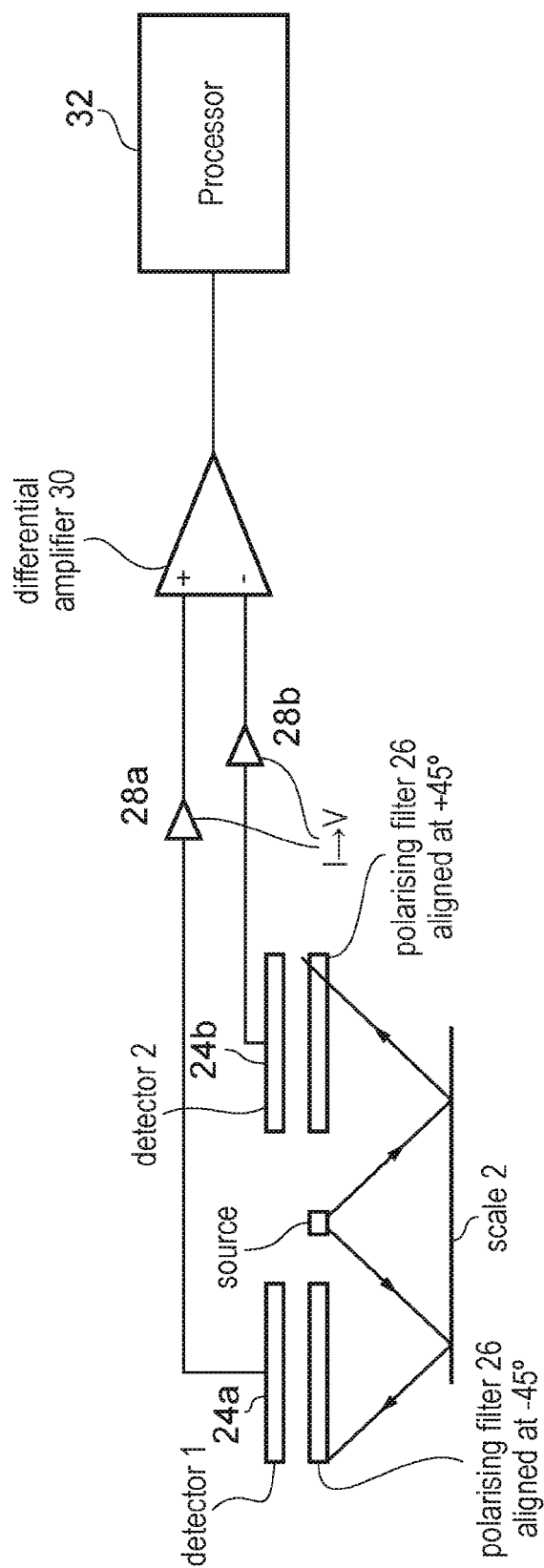

FIG. 5 is a further, simplified schematic diagram showing, in side-view, the readhead in a reading position adjacent to the device 2. The readhead includes a pair of I-V converters 28a, 28b for each detector pair. Each I-V converter 28a, 28b is connected to an output of a respective one of the detectors of the detector pair. The output of each I-V converter 28a, 28b is connected to a differential amplifier 30, which in turn is connected to a processor 32.

Figure 6:
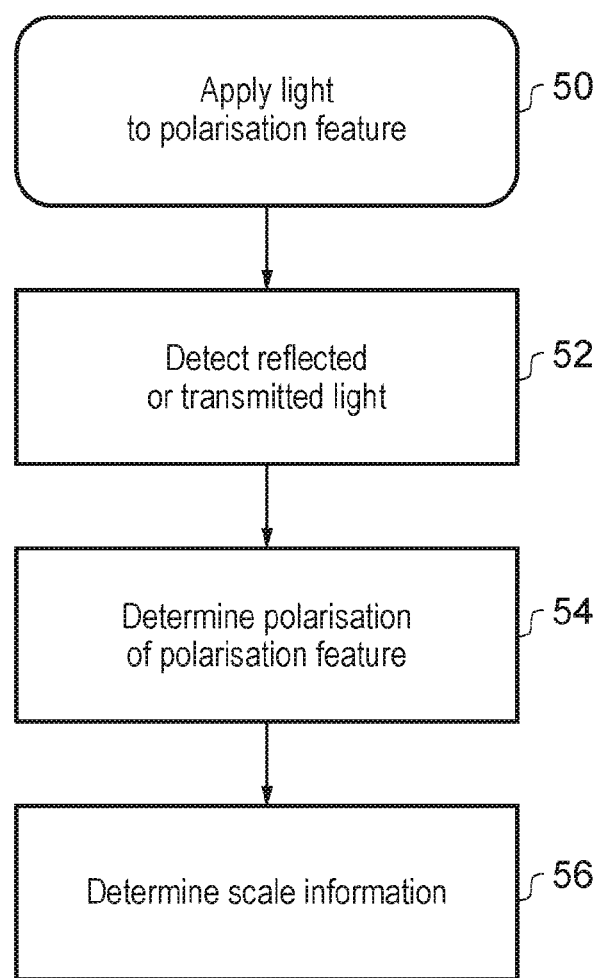
FIG. 6 is a flowchart illustrating in overview a reading of the measurement scale of FIGS. 1 and 2.

A reading of the measurement scale of FIGS. 1 and 2 is now described with reference to the flowchart shown in FIG. 6.

At the first stage of the process 50, light from the light source 22 is applied to and reflected from the scale. In this case, the scale is positioned so that the light is reflected from a plurality of periodic nanostructures, each having a polarisation feature that represents data, with light from each one of the periodic nanostructures being received by detectors of a respective one of the detector pairs.

At the next stage 52, the reflected light is detected by the detectors of the two detector arrays 24a, 24b. The detectors of one of the arrays 24a preferentially detect light that is polarised at +45 deg relative to the axis of measurement, and the detectors of the other of the detector arrays 24b preferentially detect light that is polarised at −45 deg.

At stage 54, the resulting signals from each detector is converted into a voltage by a respective I-V converter 28a, 28b. The two converted signals for each detector pair are then input to the differential amplifier 30 for that pair, which outputs a difference signal from which common mode components (including DC components) of the detector signals have been removed. The resulting signal is received by the processor 32, which processes the signal to determine whether the polarisation feature from which that detector pair received reflected light had lines orientated at +45 deg or at −45 deg relative to the axis of measurement, and therefore whether it represented a 0 or a 1 in binary code.

As the detector arrays 24a, 24b include sixteen detector pairs, each detecting light reflected from a respective periodic nanostructure, the processor 32 is able to determine the orientation, and consequently the associated binary code value, of up to sixteen periodic nanostructures of the scale for a given position of the read head 20.

In the embodiment of FIGS. 3 to 5, the size of the readhead 20 and the number of detectors is chosen such that, whatever the position of the readhead 20 relative to the measurement scale, it can always read enough polarisation features at a given position of the read head to constitute at least one full codeword.

At stage 56, the processor determines the code word represented by the binary values determined from the polarisation features, and determines the absolute position, for example by comparing the determined code word with code words stored in a look-up table or applying algorithm to code word.

Whilst the absolute scale is being read by the readhead 20, the phase scale detection unit 21a, 21b reads the incremental scale markings 8 using known techniques, for example as described in EP 0207121. In operation, unpolarised light applied by a light source of the phase scale detection unit 22 reflects from a plurality of peaks and troughs of the incremental scale and the phase scale detection unit 22 is able to detect using known techniques based on constructive and destructive interference patterns of the reflected light depending on the position of the readhead 20 relative to the scale. The incremental scale can be interpolated many times limited only by the mean accuracy of the periodic region read by the read head and noise.

The absolute position may then be combined with incremental scale information determined by the processor 32 using the phase scale detection unit 22 in order to interpolate between the absolute position markings.

The readhead 20 is then moved to a new position, and stages 50 to 56 are repeated As the absolute scale markings 6 and the incremental scale markings 8 are provided overlaid on a single measurement axis in the embodiment of FIGS. 1 and 2, both sets of scale markings can be measured using the same readhead 20, and errors due to yaw effects can be reduced or eliminated.

The presence of the polarisation features 12 overlaid on the troughs and peaks of the incremental scale markings 8 can cause some variation in the reflectivity of the incremental scale markings even for unpolarised light. The symmetrical design shown (with ±45° alignment of nanostructures) minimises reflectivity difference between states. Nanostructures reduce the overall reflectivity and must be produced to a depth that allows sufficient differential between the states for robust detection (adequate SNR) while maintaining overall reflectivity to acceptable level.

In alternative embodiments, the properties of the periodic nanostructure that represent scale device information can be read using alternative techniques, as well as or instead of determining polarisation. For example, the measurement scale may be imaged directly using light of appropriate wavelength, and/or diffractive effects produced by the at least one periodic nanostructure may be detected and the properties of the periodic nanostructures may be determined from those diffractive effects.

As mentioned above, the periodic nanostructures of the measurement scale of FIGS. 1 and 2 are LIPSS structures. It has been found that such LIPSS structures are particularly useful for representing scale device information on a measurement scale, and they can be formed in a robust and accurate manner by application of laser pulses to a surface. LIPSS may be formed with laser pulses, optionally ultrafast laser pulses, over a relatively large area (the area of an individual detector or multiple (fractional or not) of the detector, for example >10 μm in bit occurrence direction with width to suit application, for example 3 mm) and placement resolution needs only to align with the incremental well enough to identify a single incremental period; typically such alignment accuracy is ≤½ of the incremental period.

Figure 7:
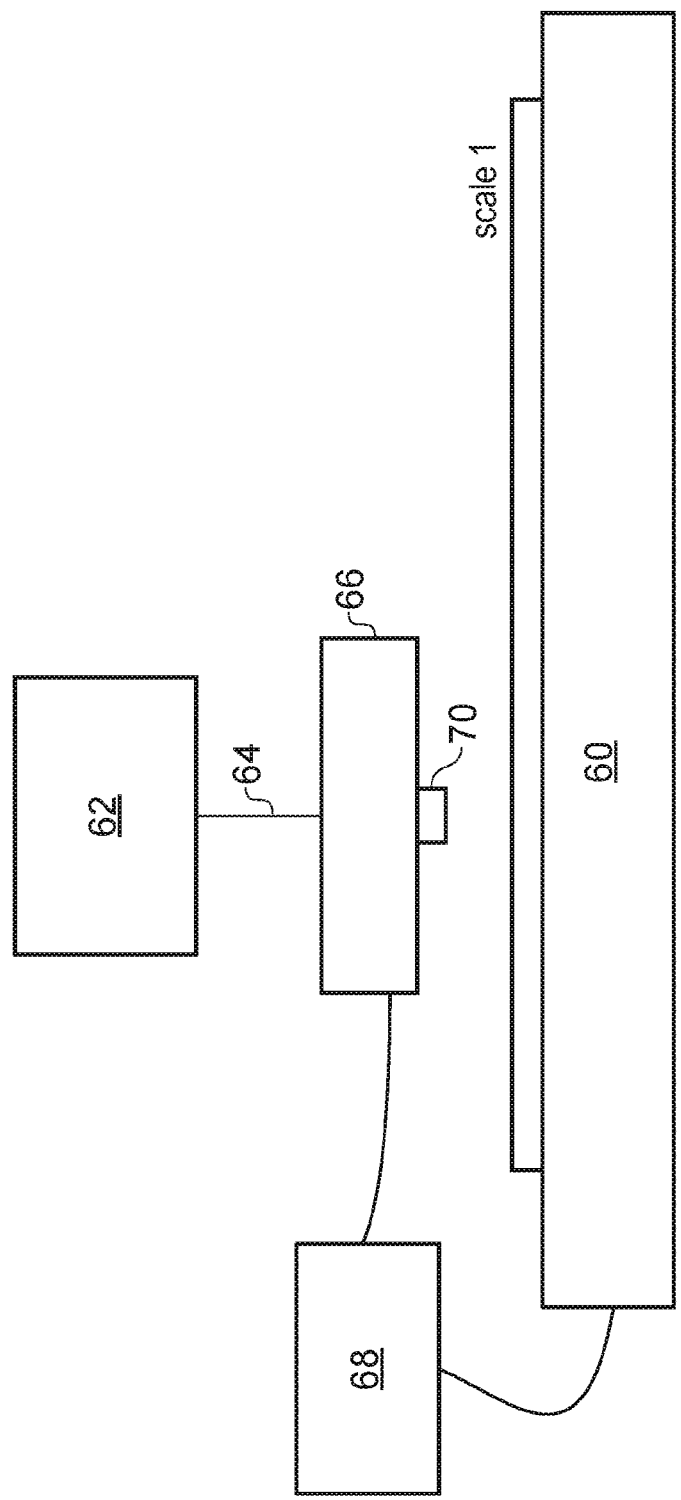
FIG. 7 is an illustration of a system for forming a measurement scale.

FIG. 7 illustrates a system for forming a measurement scale, such as that of FIGS. 1 and 2 in which scale markings are comprised of regions of LIPSS.

The system comprises a beam 60 on which is mounted a substrate material 2 on which the scale 4 is to be formed. In the case of the measurement scale of FIGS. 1 and 2, the substrate material is 304 stainless steel. The system also comprises a carriage 66 comprising a write head 70, a laser unit 62 linked to the write head of the carriage 66 by an optical path 64 and a controller 68. The laser unit 62 includes an ultrafast laser for formation of the LIPSS structures.

In operation laser radiation from the laser unit 62 is supplied to the write head via the optical path 64 and the write head 70 directs the laser radiation to a position on the substrate 2. The controller 68 is operable to control the position of the carriage relative to the beam 60, and to control operation of the laser unit, thereby to apply laser radiation of selected characteristics to any selected position on the substrate 2.

The measurement scale 4 of FIGS. 1 and 2 is formed by the system of FIG. 7 using two distinct laser processes. First the incremental scale markings are formed and then the absolute scale markings are formed by writing LIPSS polarisation features.

In the first process, the incremental scale is formed by melting the surface of the substrate as described in WO 2012/038707. Laser pulses of tens of nanoseconds duration are applied by the laser unit 62 via the write head 70. The laser pulses are delivered to the point of writing by the optical path 64 linking the laser to the carriage 66, alternatively the laser 62 moves with the carriage 66. The carriage 66 is capable of movement along the length of the beam and is equipped with accurate position feedback (via the controller 68) to ensure that the melted regions are placed correctly with a desired accuracy. The formation of the incremental scale may take one or more passes of the carriage 66 along the scale length. For instance, a smoothly undulating surface profile with a period of, for example, 4 μm or 8 μm and mean peak-to-trough distance of, for example, 190 nm or 200 nm can be made on 304 stainless steel by melting with laser pulses of tens of nanoseconds duration.

In the second process, the LIPSS structures making up the absolute scale markings are then written onto the incremental scale markings.

To create the LIPSS structures, the material surface is irradiated with polarised laser pulses of appropriate pulse length and fluence (typically ultrafast pulses of fluence near the ablation threshold of the surface). Lines of surface structure appear orthogonal to the polarisation of the laser light, so rotation of the polarisation of the writing laser beam facilitates formation of binary bits on the scale surface. The period of the lines is characteristic of the surface material and the wavelength of the laser.

In the embodiment of FIG. 7 an ultrafast pulse laser unit 62 is used, during one or more passage(s) of the carriage 66, to form regions of LIPSS that are orientated at +45 deg to the axis of measurement and so write all the positive binary states. On the next passage of the carriage 66, the polarisation of the ultrafast laser is rotated by −90 deg (to −45 deg relative to the axis of measurement) and writes the negative data regions onto the scale.

The laser used to create the LIPSS structures in the embodiment of FIG. 7 is an ultrafast laser with an energy near the ablation threshold: just above the ablation threshold for single pulse writing; just above or just below for multi-pulse writing. A succession of pulses is applied to the surface. Each pulse can be shaped to produce 4 mm wide and 10 μm long, and the substrate is moved relative to the laser at a velocity determined by the laser repetition rate, width of the affected surface and number of pulses demanded. Alternatively the laser beam, of typically Ø10 μm, may be raster scanned to give the width of the periodic nanostructures.

Once a LIPSS structure has been formed by one or more laser pulses, subsequent pulses of the same polarisation applied to the same region will lock into the existing pattern and maintain the periodicity and phase of the original structure, thus allowing an extended region of LIPSS to be built up from multiple pulses. That feature of LIPSS formation enables polarisation features of suitable size and uniformity for use as scale features to be formed in a straightforward and reliable manner.

The pulsed laser process can be used to form LIPSS on any appropriate surface. In the embodiment of FIGS. 1 and 2, LIPSS structures are formed on the surface of an incremental scale that was formed using processes described in WO 2012/038707. However, in alternative embodiments LIPSS scale markings can be formed as the only scale markings on a scale, or overwritten on any of a wide variety of scale markings. LIPSS structures can be written onto any appropriate existing scale.

In alternative embodiments, scale device information is represented using a property of the periodic nanostructures other than a polarisation property of the structures. For example the or each periodic nanostructure can be formed to represent scale device information using at least one of orientation, depth and period of the periodic nanostructure.

Figure 8:
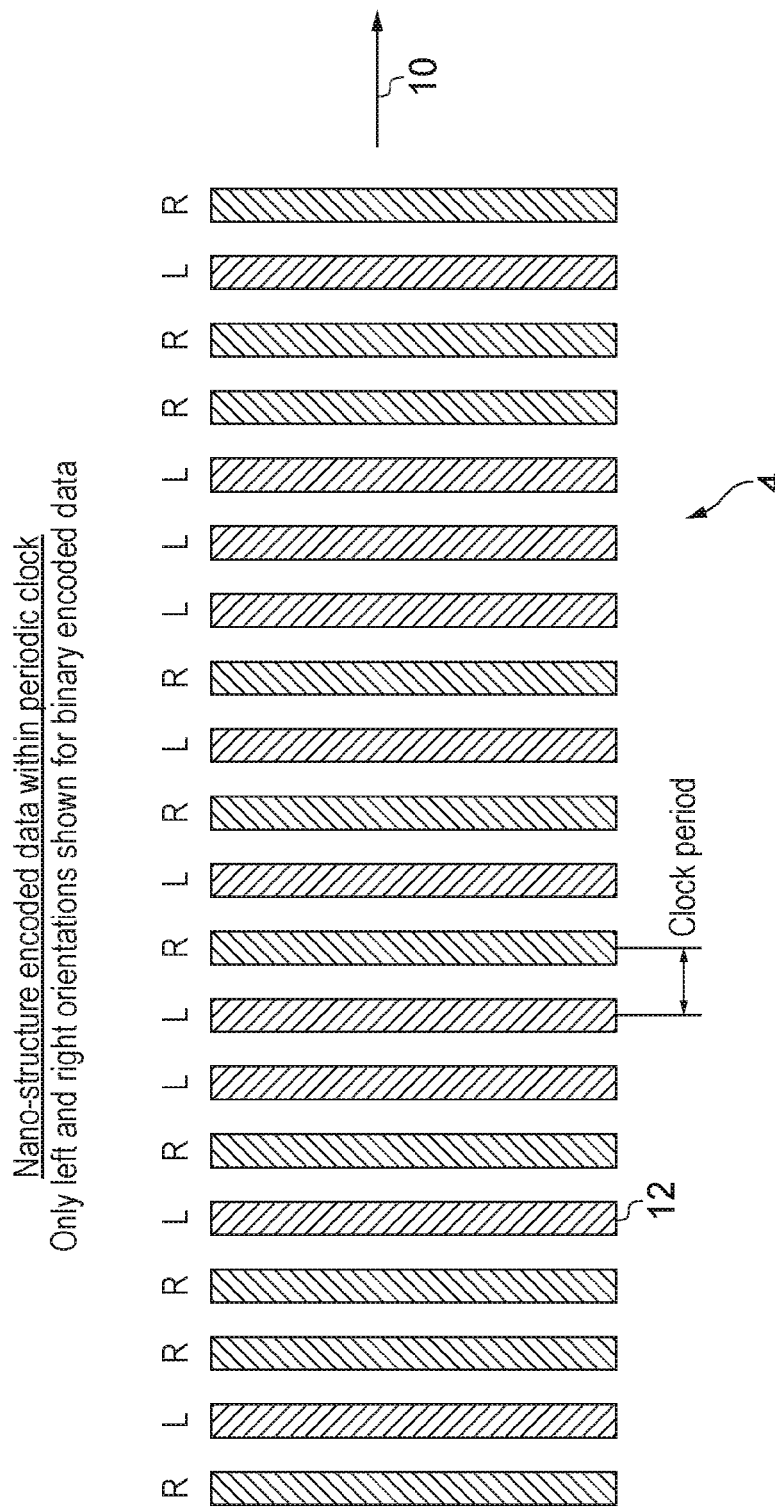
FIG. 8 is an illustration of a measurement scale comprising a series of binary scale markings.

A measurement scale according to any alternative embodiment is illustrated in FIG. 8. FIG. 8 is a simplified drawing of a measurement scale comprising a series of incremental scale markings, in which the incremental scale markings 8 are polarisation features 12 arranged along axis of measurement 10. Regions of LIPSS of +45 deg and −45 deg orientation are used in an alternating sequence, with the distance between adjacent regions being the incremental period.

Scale markings comprising polarisation features representing scale device information using a polarisation property are not limited to being absolute scale markings but instead, in alternative embodiments, represent any desired type of scale marking.

In various embodiments, the scale markings comprising at least one nanostructure can represent either position information or non-position related data concerning the scale. In some embodiments, the scale markings represent for example, a serial number of the scale, a manufacturer or other identifier, or authentication or security data.

In certain embodiments, the scale device information is an indication of a limit. A limit mark is used to indicate the end of a scale. A limit mark in certain embodiments comprises a polarisation feature, for example a LIPSS structure, marking an end of a scale. Limit patterns of different polarisations are used at each end of the scale to indicate which limit is being read, in some embodiments. In alternative embodiments, limits are implemented with different polarisations written across the scale (perpendicular to the measurement axis), with one polarisation to a first side of the measurement axis and another to a second side, with the two polarisations reversed at the opposite end of the scale.

Figure 10:
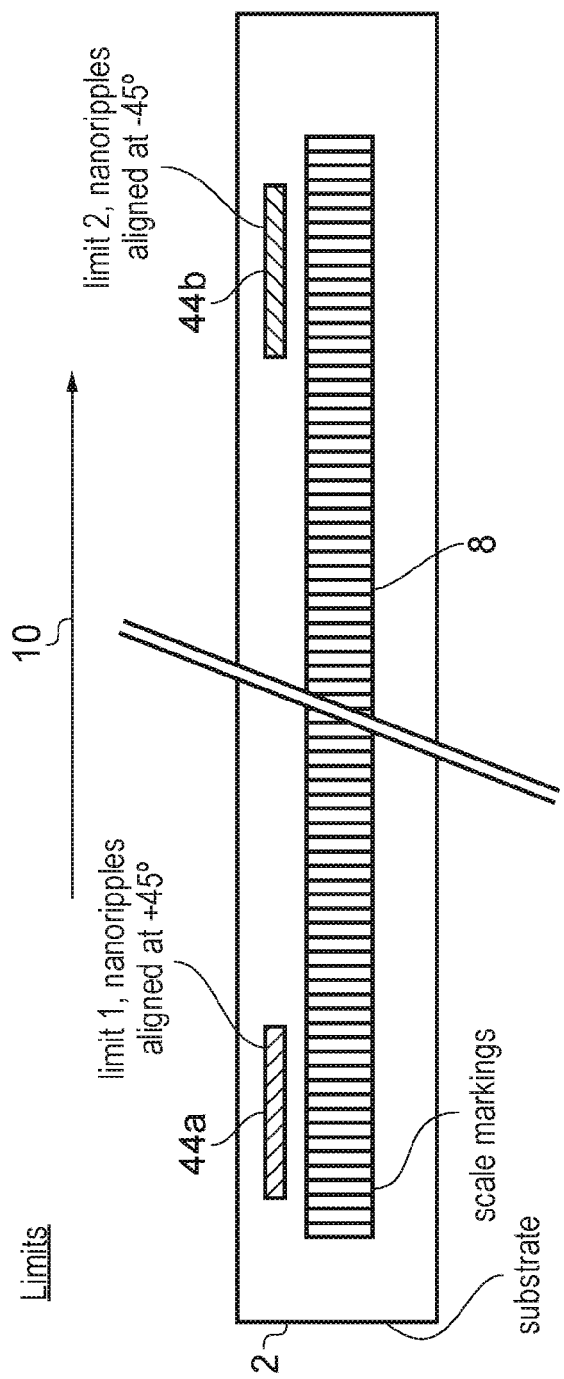
FIG. 10 is an illustration of a series of scale markings and a pair of limit marks.

FIG. 10 shows a simplified drawing of a scale comprising a series of scale markings 8 (which may or may not comprise polarisation features) and a pair of limit marks 44a and 44b. A first limit mark 44a is a region of LIPSS orientated at +45 deg relative to axis of measurement 10, and a second limit mark 44b is a region of LIPSS orientated at −45 deg relative to the axis of measurement. Therefore the ends of the scale may be distinguished by differential detection of polarised light to determine the different orientations of the marks.

In other embodiments, the scale device information represented by a polarisation property is an indication of a reference position. On incremental scales, reference marks are used to indicate known positions enabling determination of incremental position with reference to such known positions. A reference mark according to an embodiment comprises a transition between two regions of orthogonal polarisation written onto the scale. In this case split pairs of differential readers are used to generate a sum and difference signal in the usual way for detection of reference marks. In other embodiments, reference marks comprising polarisation features are more complex and in some cases comprise a divergent autocorrelation pattern or cross-correlation pattern, or comprise codewords, and/or have a polarisation property that rotates along the linear extent of the reference mark. In embodiments, in which a reference mark comprises a polarisation feature the reference mark can be separate from a series of scale markings, or can be overlaid on, overlapping with, or interleaved with a series of scale markings.

Figure 9:
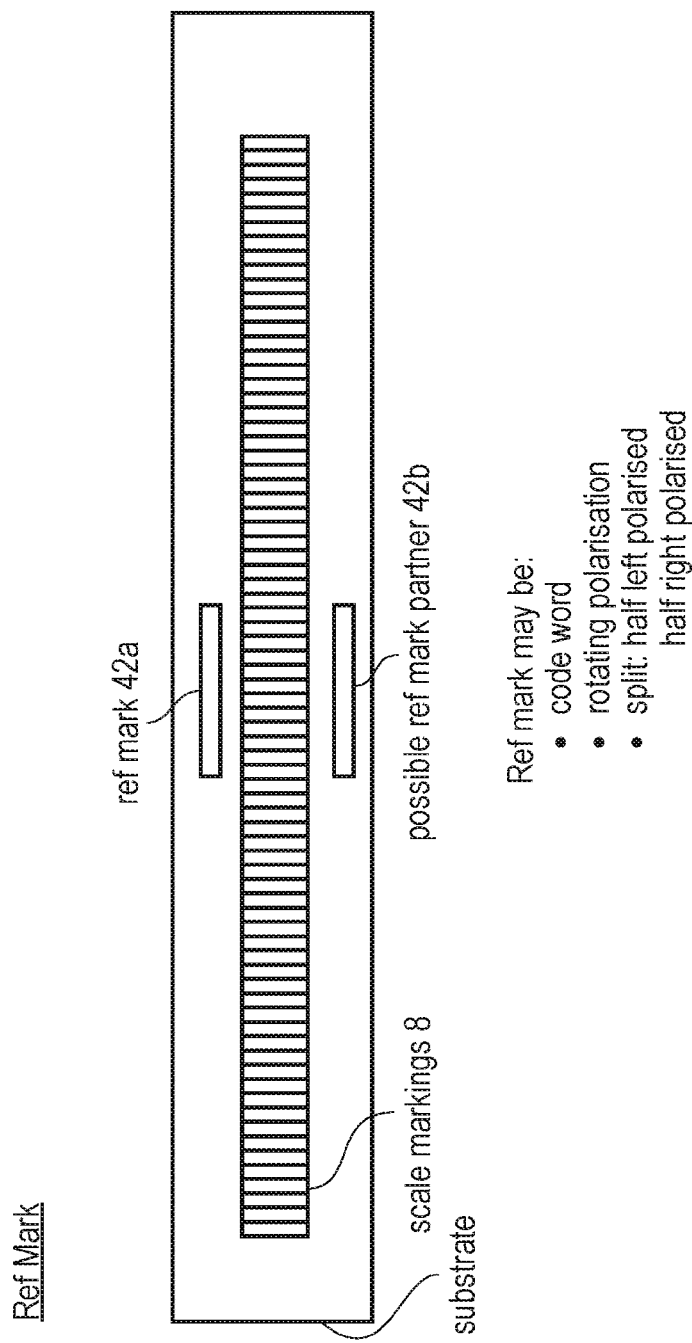
FIG. 9 is an illustration of a scale comprising a series of scale markings and a pair of reference marks.

FIG. 9 is a simplified diagram of a series of scale markings 8 (which may or may not comprise polarisation features). A reference mark 42a is drawn on one or both sides of the scale. The reference mark indicates a reference position. It may be paired with another reference mark 42b on the opposite side of the scale for accurate reference positioning over a range of yaw alignment. The reference marks comprise regions encoded in periodic nanostructures having angles of alignment of the nanostructure features of +45 degrees or −45 degrees, but any other suitable polarisation property can be used in alternative embodiments; for example, progressively rotating polarisation alignment. Or other methods of reading periodic nano-structured surfaces.

In other embodiments, a scale marking comprising at least one nanostructure represents a direction marker, which indicates a direction to a scale feature, for example a direction to one end of the scale or a direction to a position mark or reference mark.

In other embodiments, marks comprising at least one periodic nanostructure are used to encode error information, for example an error map or error codes. In certain embodiments such embodiment the marks are overlaid on top of or near an existing series of incremental or absolute scale markings. The incremental or absolute series of scale markings may include some position errors due to errors during formation. The errors are determined by interferometer measurements performed in a vacuum in accordance with known techniques. Error marks comprising at least one periodic nanostructure are then written at a series of positions along the scale and represent the error in the incremental or absolute scale pertaining at each of those positions. In some such embodiments, the error is represented by the polarisation angle or angle of orientation of a periodic nanostructure, which angle is allowed to take any one of a continuous series of angles. Thus the error can be read as an analogue signal, which can reduce processing requirements.

In the embodiment of FIGS. 1 and 2, an incremental scale is formed using a known process and then absolute scale marking are overlaid on the incremental scale markings. Embodiments are not limited to such an arrangement, and LIPSS or other techniques can be used to form scale marks comprising polarisation features in any desired arrangement. For example, in alternative embodiments, the absolute scale markings are arranged such that they overlap the incremental scale markings, or such that the absolute scale markings and incremental scale markings are interleaved, or spatially separated. In any of these cases, the absolute scale markings and incremental scale markings can be formed so that they share a common axis of measurement.

As mentioned, in alternative embodiments, the scale markings that comprise polarisation features are incremental scale markings or reference marks rather than absolute scale markings. In some embodiments, the scale also includes a second series of scale markings of any desired type, for example absolute scale markings, incremental scale markings, or reference marks. In such embodiments, the second series of scale markings is not limited to being optically read. The second series of scale markings can represent scale device information in any suitable way, for example any way that is independently readable with regard to the first series of scale markings. For instance, in some embodiments, the second series of scale marking represent scale device information with an optical parameter, a magnetic parameter or a capacitive parameter.

Examples of types of scale markings that can be used for the second series of scale features include scale markings of etched glass, etched metal, laser ablated metal, forged metal, chromed regions on glass with mirror back, chrome on glass Ronchi, magnetic regions, capacitive (permittivity regions).

Each of these scales has a surface that can be selectively modified by the addition of periodic nanostructures, for example LIPSS structures.

In one embodiment, LIPSS or other polarisation features representing absolute scale markings are added to rectangular profile scale gratings that are etched in glass and gold plated. Existing scale designs, for example Renishaw (RTM) RG, spar, rings or ribbon scale can have regions of LIPSS or other polarisation features added to form reference marks or absolute data.

In the embodiment of FIGS. 1 to 2, each polarisation feature reflects electromagnetic radiation in a first direction of polarisation more strongly than it reflects electromagnetic radiation in a second direction of polarisation. In alternative embodiments the polarisation features, for example LIPSS or other periodic nanostructures transmit rather than reflect applied electromagnetic radiation, with a preferred polarisation direction. In either cases, a preferential direction of polarisation can be established and this preferential direction of polarisation used to represent scale device information. In specific embodiments, the electromagnetic radiation in question is light in the visible or near-ultraviolet or near infrared range.

In further alternative embodiments, scale markings are written onto the scale with intermediate polarisations as well as with orthogonal polarisations. Detectors that read intermediate polarisations are provided. Alternatively, the processor or associated circuitry interpolates measurements by differential pairs of detectors, thereby to measure the polarisation of light reflected or transmitted by regions of the scale that do not perfectly align with the polarisation of either of the detectors of the pairs. In this way, an analogue signal representing the polarisation of a region of the scale, whether aligned with any sensor or not, can be generated. By such means three or more polarisations can be used to encode scale device information on the scale.

In the case of absolute scale markings, embodiments such as those described in the preceding paragraph allow the absolute distance code to be implemented in base 3 or more, instead of coding the absolute position in binary. This can have the advantage of increasing code robustness or the number of unique codes available leading to longer scale lengths, or smaller portions of scale to be inspected for a given maximum code length, which in turn can allow for a smaller readhead.

Figure 11:
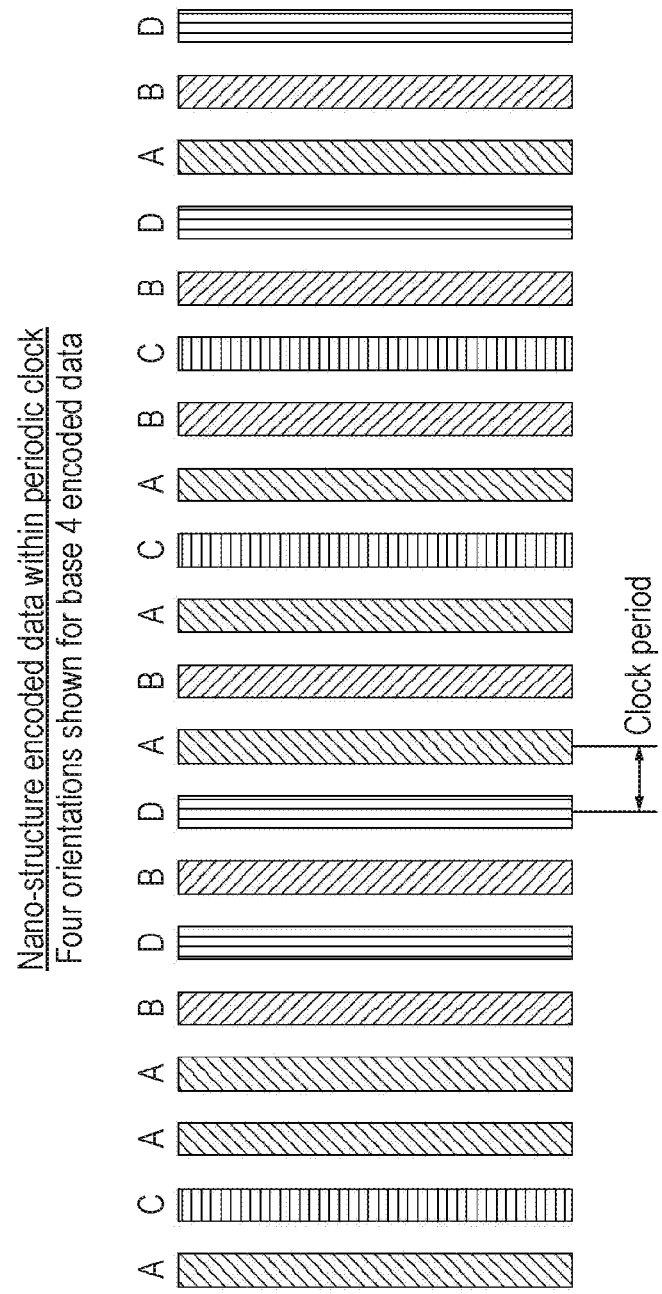
FIG. 11 is an illustration of a measurement scale comprising a series of scale markings that encode data in base 4.

A marking comprising periodic nanostructures having four different orientations, and thus allowing encoding of data in base 4 is illustrated schematically in FIG. 11 by way of example. Regions of LIPSS of 0°, +45°, −45° and 90° are used in an alternating sequence to encode data.

Figure 12:
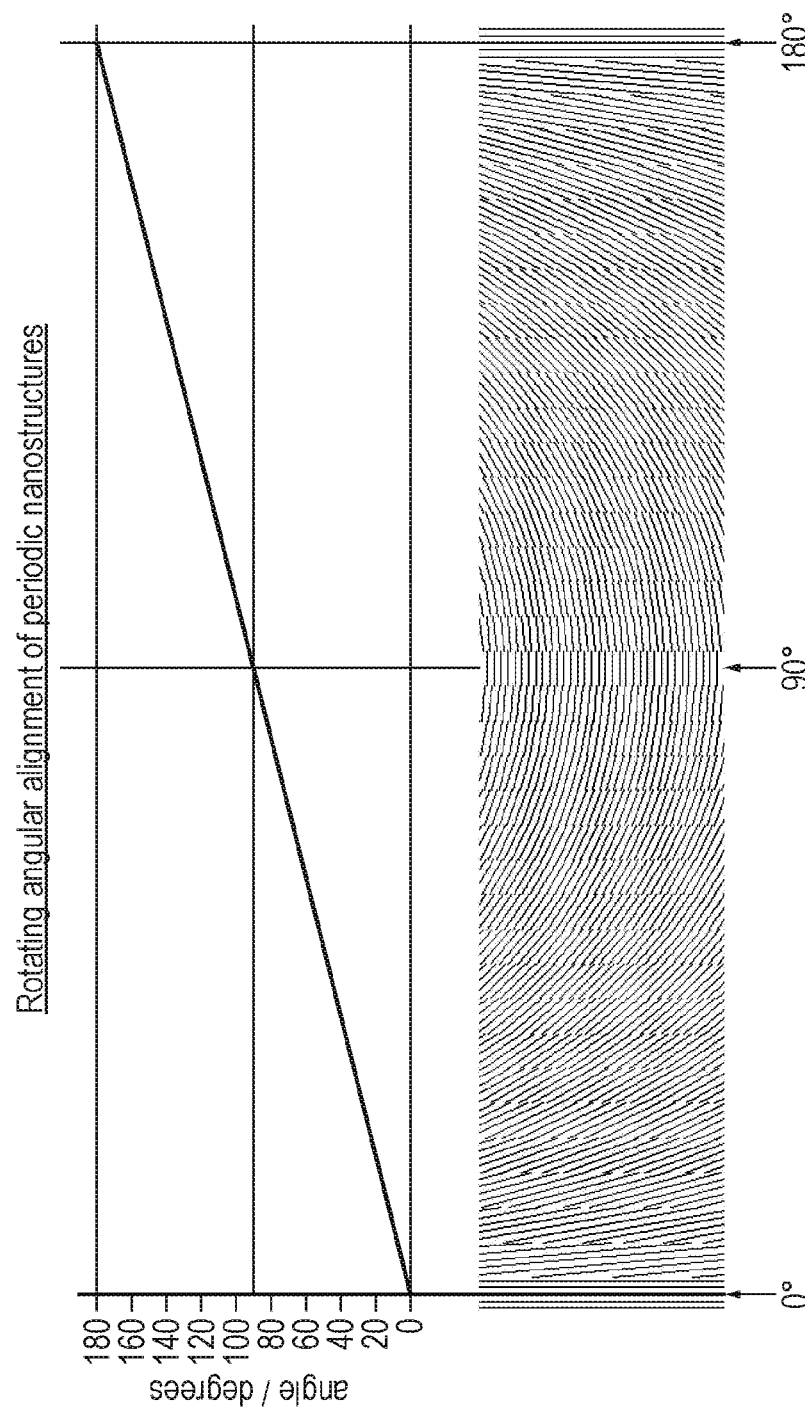
FIG. 12 is an illustration of a marking comprising a periodic nanostructure in which the orientation of the lines of the nanostructure varies with position.

In the embodiment of FIGS. 1 and 2 each polarisation feature is a region of LIPSS in which all the parallel lines are in a single orientation. This region of LIPSS may be contiguous to a region of LIPSS of a different orientation, such that a discontinuity occurred at the boundary between them In alternative embodiments, a polarisation feature comprises an extended region of LIPSS or other nanostructure in which the orientation of the lines varies with displacement through the lateral extent of the polarisation feature. One such embodiment is illustrated schematically in FIG. 12. A single polarisation feature of this type may be used, for example, as a reference marker. A detector can be configured to detect a preferential direction of polarisation. The reference position can be defined as the point at which the preferential direction of polarisation matches the orientation of a part of the extended region of LIPSS or other nanostructure. Alternatively, the detector has polarisation sensitivity matched to the polarisation alteration along the length of the reference mark; reference position being when the entire polarisation encoded regions align to give a distinct correlation output; and autocorrelator for polarisation encoded data. Such an encoded region could be an encoded word particularly suited to correlation (such as a modified Barker code) or angle of polarisation where angle of polarisation continually or monotonically increases with distance along the feature and matched detector.

In variants of the embodiment described in the preceding paragraph, a series of the polarisation features of varying polarisation are written contiguously to form an extended region. A series of positions may be determined, each position being determined when the preferential direction of polarisation matches the orientation of the parallel lines, thus determining a sequence of equally-spaced marks.

Whilst it has been found that LIPSS provides an advantageous technique for creating scale markings comprising periodic nanostructures, in alternative embodiments other methods can be used to create the periodic nanostructures, for example replication, electron beam lithography, focused ion beam writing, etching for example photoetching (in ultraviolet), or semiconductor fabrication lithography. For instance, nano-structures may be replicated in a thin, non-robust coating bonded to a robust substrate.

In some embodiments of the measurement scale, the polarisation features are contiguous. In others, they are separate or overlap.

The lateral extent of each polarisation feature forming part of a first series of scale marking is selected in dependence on a parameter of a second series of scale markings in certain embodiments. For example, in embodiments in which the second series of scale markings is an amplitude scale, regions of LIPSS structures may be written over the entire area in which the second series of scale markings is present. That can help to reduce variations in reflectivity of the scale with regard to unpolarised light caused by the presence or absence of overlaid LIPSS structures or other nanostructures.

Where the second series of scale markings is an incremental scale, the lateral extent of polarisation features is selected in certain embodiments in dependence on incremental period of the second series of scale markings. For example, the lateral extent of each polarisation feature is selected to be a non-integer multiple of the incremental period in some embodiments, for instance 1.5 times the size of the incremental period. Or even a prime multiple such as 3.7 times.

The lateral extent of each polarisation feature in a direction along the measurement axis can be chosen to have any suitable value, for example between 1 μm and 100 μm. Multiple laser pulses can be used to build up extended areas of LIPSS.

Scale markings comprising LIPSS or other polarisation features can be written onto many surfaces, and the surfaces are not limited to stainless steel as described in relation to the first embodiment. Silver and stainless steel have both been shown to form LIPSS as have many other metals. The first report of LIPSS observed periodic structures on various semiconductors after surface damage caused by a ruby laser pulse or pulses. Since that report there have been many studies with semiconductors including Si, Ge, InP, GaP and GaAs other compound semiconductors. LIPSS have been made on fused-silica, so absolute data could be added to highly efficient rectangular profile scale gratings etched in glass and gold plated. However, LIPSS can also be formed of a wide variety of other materials, whether metals, dielectrics or semiconductors. Indeed, LIPSS may be formed on any materials capable of forming a surface plasmon, for example under conditions found during exposure to intense electromagnetic field such as that from a laser pulse near the ablation threshold of the material.

LIPSS regions can be added to a measurement scale comprising a series of scale markings, as an additional step in the usual fabrication process. Alternatively, LIPSS may be added at any time after the second series of scale markings has been formed. LIPSS regions may be retrofitted to any appropriate existing scale.

LIPSS have been produced using lasers that range from continuous wave to picosecond lasers. The first embodiment described using a laser intensity that is just above the ablation threshold. However, this does not discount other regimes. Any laser and associated set of operating conditions that is capable of forming LIPSS on a suitable surface can be used.

The measurement scale is not limited to being a linear scale for measurement along a single measurement axis. The measurement scales of alternative embodiments include, for example, rotary scales. The scales in certain embodiments are two-dimensional scales, having two substantially orthogonal axes of measurement, and scale markings comprising polarisation features are arranged along one or both axes of measurement.

Any suitable method can be used to read the measurement scales. For example, light from two polarised light sources can be applied to a polarisation feature in an alternating manner. Alternatively, light from a single light source can be passed through a polarising beam splitter to provide two polarisations of light. An unpolarised detector is used to detect the reflected light when illuminated by light of a first polarisation, and then by light of a second polarisation. The detected signals can be compared in a differential manner as described above.

Detectors having different sensitivity to orthogonal polarisations of light can be produced by any suitable method, for example by fitting polarising filters, using Brewster's effect, wire grids, or direct surface structuring. Two identical reader chips can be mounted on two faces of a polarising beam splitter, and the output from the two reader chips can be compared.

Polarising filters are common, inexpensive components that can give good attenuation of light in blocking polarisation orientation, although plastic versions can have moisture sensitivity and glass versions can be difficult to cut. It is possible to orient the detectors or optical elements in front of the detectors to favour the passage of one polarisation orientation utilising Brewster's effect. All of these methods require the addition of one or more elements to the optical path in an encoder, which can cause an increase in size and complexity.

Fine metal grids can be formed directly onto the detector using an electron beam to write into photo-resist applied to the detector surface. These gratings are a fraction of the wavelength of light in period so the electron beam is necessary for writing to this spatial resolution. Deposition of a metal layer and removal of the excess resist can then form a fine grid or grating that favours the transmission of a particular orientation of polarised light. This method fits well with the semiconductor fabrication methods used in detector manufacture.

LIPSS themselves may be used on the surface of gratings and, like wire grids, are of negligible thickness. Grids and LIPSS do not give high attenuation of the unfavoured polarisation orientation so differential detection is recommended for high signal discrimination.

In certain embodiments, periodic structures can be formed directly onto the surface of detectors and thereby realise differential absorption of orthogonal polarisations of incoming light.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A measurement scale device comprising:
   at least one scale marking, wherein:
   the or each scale marking comprises at least one periodic nanostructure that (i) represents scale device information and (ii) comprises a Laser Induced Periodic Surface Structure (LIPSS), and
   the measurement scale device is for determining relative position of two objects.

2. A measurement scale device according to claim 1, wherein the or each periodic nanostructure comprises a plurality of substantially parallel lines.

3. A measurement scale device according to claim 1, wherein the information represented by the at least one periodic nanostructure comprises position information or non-position related data concerning the scale device.

4. A measurement scale device according to claim 1, wherein the or each periodic nanostructure represents the information using at least one of orientation, depth and period of the periodic nanostructure.

5. A measurement scale device according to claim 1, wherein the scale device information represented by the at least one periodic nanostructure comprises at least one of (a) absolute position information; and (b) relative position information.

6. A measurement scale device according to claim 1, wherein the scale device information represented by the at least one periodic nanostructure comprises at least one of: (a) indication of a limit; (b) indication of a reference position; and (c) direction information.

7. A measurement scale device according to claim 1, wherein the scale device information represented by the at least one periodic nanostructure comprises at least one of: (a) error information; (b) a scale or scale manufacturer identifier; and (c) an error map representing errors in an associated series of scale markings.

8. A measurement scale device according to claim 1, wherein the scale device information represented by the at least one periodic nanostructure comprises authentication or security data.

9. A measurement scale device according to claim 1, wherein the at least one scale marking comprises a plurality of scale markings forming a first series of scale markings, and the measurement scale device further comprises a second series of scale markings.

10. A measurement scale device according to claim 9, wherein the first series of scale markings and the second series of scale markings share a common axis of measurement.

11. A measurement scale device according to claim 9, wherein the first series of scale markings comprises one of absolute scale markings, incremental scale markings and reference marks, and the second series of scale markings comprises another of absolute scale markings, incremental scale markings, and reference marks.

12. A measurement scale device according to claim 9, wherein at least one of the first series of scale markings is overlaid with at least one of the second series of scale markings.

13. A measurement scale device according to claim 9, wherein the first series of scale markings is interleaved with the second series of scale markings.

14. A measurement scale device according to claim 9, wherein scale device information represented by the first series of scale markings is independently readable with regard to scale device information represented by the second series of scale markings.

15. A measurement scale device according to claim 9, wherein the scale markings of the second series are of a type different than the scale markings of the first series.

16. A measurement scale device according to claim 1, wherein the at least one scale marking comprises a plurality of scale markings.

17. A measurement scale device according to claim 16, wherein the scale markings are substantially identical.

18. A measurement scale device according to claim 16, wherein the scale markings are substantially equally-spaced along a measurement axis.

19. A measurement scale device according to claim 1, wherein the or each periodic nanostructure represents the scale device information using a polarisation property of the periodic nanostructure.

20. A measurement scale device according to claim 19, wherein a preferential direction of polarisation of each periodic nanostructure represents the scale device information.

21. A measurement scale device according to claim 1, wherein for the periodic nanostructure or each of the periodic nanostructures, a property of the periodic nanostructure that represents the scale device information has one of a selected number of discrete values.

22. A measurement scale device according to claim 21, wherein each of the selected number of discrete values represents a respective data value, with the scale device information being represented by the data values.

23. A measurement scale device according to claim 1, wherein for the periodic nanostructure or each of the periodic nanostructures, a property of the periodic nanostructure that represents the scale device information varies with displacement along a measurement axis of the scale device.

24. A measurement scale device according to claim 1, wherein the at least one scale marking form a measurement scale for an encoder.

25. A measurement scale device according to claim 1, wherein the at least one scale marking form a linear scale for an encoder.

26. A measurement scale device according to claim 1, wherein the at least one scale marking form a rotary scale for an encoder.

27. An encoder comprising:
a measurement scale device according to claim 1; and
a read head for reading information from the measurement scale device.

28. A method of reading a marking of a measurement scale device according to claim 1, comprising:
detecting electromagnetic radiation that is reflected or transmitted by the at least one periodic nanostructure,
determining at least one property of the at least one periodic nanostructure from the detected electromagnetic radiation, and
determining scale device information from the at least one property.

29. A method according to claim 28, wherein the determining of the at least one property comprises determining at least one polarisation property.

30. A method according to claim 28, wherein the method of reading comprises at least one of imaging the measurement scale and detecting diffractive effects produced by the at least one periodic nanostructure.

31. A method according to claim 28, wherein the at least one property has one of a selected number of discrete values, each of the selected number of discrete values representing a respective data value, and the scale device information being represented by the data values.

32. A read head for reading a marking of a measurement scale device according to claim 1, comprising:
a source of electromagnetic radiation,
a detector for detecting electromagnetic radiation that is reflected or transmitted by the at least one periodic nanostructure of the scale,
means for determining at least one property of the at least one periodic nanostructure from the detected electromagnetic radiation, and
means for determining scale device information from the at least one property.

33. A measurement scale device according to claim 1, wherein the or each periodic nanostructure represents a data bit that comprises a binary digit.

34. A method of forming a measurement scale device, the method comprising:
forming at least one scale marking on a surface by applying at least one pulse of laser radiation to a region of the surface, the at least one scale marking comprising a periodic nanostructure that represents scale device information,
wherein the measurement scale device is for determining relative position of two objects.

35. A method of forming a measurement scale device, the method comprising:
forming at least one scale marking on a surface, the at least one scale marking comprising a periodic nanostructure that represents scale device information; and
applying at least one pulse of linearly polarised laser radiation to the surface to form at least one region of Laser Induced Periodic Surface Structure (LIPSS),
wherein the measurement scale device is for determining relative position of two objects.

36. A method of reading a marking of a measurement scale device that comprises at least one scale marking, the or each scale marking comprising at least one periodic nanostructure that represents scale device information, and the method comprising:
applying electromagnetic radiation to the scale device;
detecting the electromagnetic radiation that is reflected or transmitted by the at least one periodic nanostructure;
determining at least one property of the at least one periodic nanostructure from the detected electromagnetic radiation; and
determining scale device information from the at least one property, wherein:
the applied electromagnetic radiation has a maximum intensity at a wavelength that is greater than the period of the periodic nanostructure, and
the measurement scale device is for determining relative position of two objects.

* * * * *